(12) United States Patent
Simper et al.

(10) Patent No.: US 9,178,355 B2
(45) Date of Patent: Nov. 3, 2015

(54) CROSS COMMUNICATION ARRANGEMENT FOR MULTIPLE SOLID STATE POWER CONTROLLER CHANNELS

(75) Inventors: Norbert J. Simper, Bissingen (DE); Markus Greither, Augsburg (DE); Alexander Michel, Kirchheim am Ries (DE); Carl A. Wagner, Beloit, WI (US); Andrew David Bellis, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 715 days.

(21) Appl. No.: 13/493,220

(22) Filed: Jun. 11, 2012

(65) Prior Publication Data
US 2013/0144447 A1 Jun. 6, 2013

Related U.S. Application Data

(60) Provisional application No. 61/566,283, filed on Dec. 2, 2011.

(51) Int. Cl.
*H02J 3/26* (2006.01)
*H02J 13/00* (2006.01)

(52) U.S. Cl.
CPC .............. *H02J 3/26* (2013.01); *H02J 13/0062* (2013.01)

(58) Field of Classification Search
CPC .............. G06F 1/18; G06F 1/189; G06F 1/26; H02J 3/26; H02J 13/0062
USPC .......................................................... 700/286
See application file for complete search history.

(56) References Cited

U.S. PATENT DOCUMENTS

| | | | |
|---|---|---|---|
| 5,761,518 A * | 6/1998 | Boehling et al. ................... 710/1 |
| 6,470,224 B1 | 10/2002 | Drake et al. |
| 6,768,350 B1 | 7/2004 | Dickey |
| 6,856,045 B1 | 2/2005 | Beneditz et al. |
| 7,064,448 B2 | 6/2006 | Maier |
| 7,363,129 B1 * | 4/2008 | Barnicle et al. ................... 701/1 |
| 7,505,820 B2 | 3/2009 | Plivcic et al. |
| 7,747,879 B2 | 6/2010 | Tofigh et al. |
| 8,031,451 B2 | 10/2011 | Beneditz et al. |
| 8,089,303 B2 | 1/2012 | Girot et al. |
| 8,148,848 B2 | 4/2012 | Rusan et al. |
| 2008/0217471 A1 * | 9/2008 | Liu et al. ........................ 244/1 R |

* cited by examiner

*Primary Examiner* — Mohammad Ali
*Assistant Examiner* — Nathan L Laughlin
(74) *Attorney, Agent, or Firm* — Carlson, Gaskey & Olds, P.C.

(57) ABSTRACT

A multi-phase power control switch has multiple power controller channels, each of which includes at least one power controller having a microprocessor. Each of the microprocessors cross communicates with each other of the microprocessors using a data bus.

18 Claims, 2 Drawing Sheets

… (US 9,178,355 B2)

CROSS COMMUNICATION ARRANGEMENT FOR MULTIPLE SOLID STATE POWER CONTROLLER CHANNELS

REFERENCE TO RELATED APPLICATIONS

This application claims priority to U.S. Provisional Patent Application No. 61/566,283, filed Dec. 2, 2011.

BACKGROUND OF THE INVENTION

The present disclosure is related to multi-phase power switching, and more particularly to a cross-communicating multi-phase power control switch.

Power distribution systems, such as aircraft AC power systems, often include a requirement that each of multiple phases be operated and controlled simultaneously by separate power channels. As a result of using separate channels, there can be short, undesirable, periods when some phases of the power distribution system are on and other phases are off. Communication between the controller (or controllers) in each power channel is utilized to synchronize the separate channels and to minimize these periods.

In conventional systems, each of the power channels is referenced to a local reference voltage from a local power supply isolated from a reference voltage of the overall power distribution system. The independent power supply is referred to as a floating power supply. Due to the floating reference voltages, each solid state power controller cannot communicate directly with each other power controller without using an isolator circuit to isolate the communication signals from the reference voltage. The inclusion of an isolator circuit to connect each power controller in a power control switch to each other power controller in the power control switch, and thereby enable cross-communication between the controllers, is heavy and expensive. To get around this limitation, some existing power distribution systems connect each solid-state power controller to a systems level controller outside of the power control switch. This control method includes an additional time delay, and does not allow for all of the features that can be derived from direct cross-communication between each of the power controllers.

SUMMARY OF THE INVENTION

Disclosed is a multi-phase power control switch having a plurality of power controller channels, each of which includes at least one power controller having at least one microcontroller. Each of the power controller channels has an isolator corresponding to each of the microcontrollers and connecting a cross communication line of the corresponding microcontroller to a data bus. The data bus is operable to enable cross communication between each of the microcontrollers and each other of the microcontrollers.

Also disclosed is a power distribution system having a plurality of multi-phase power control switches, wherein each of the multi-phase power control switches has a plurality of power controller channels, each of which includes at least one power controller having at least one microcontroller. Each of the power controller channels also has an isolator corresponding to each of the microcontrollers and connecting a cross communication line of the corresponding microcontroller to a data bus. The data bus is operable to enable cross communication between each of the microcontrollers and each other of the microcontrollers.

These and other features of this application will be best understood from the following specification and drawings, the following of which is a brief description.

DETAILED DESCRIPTION

Figure 1:
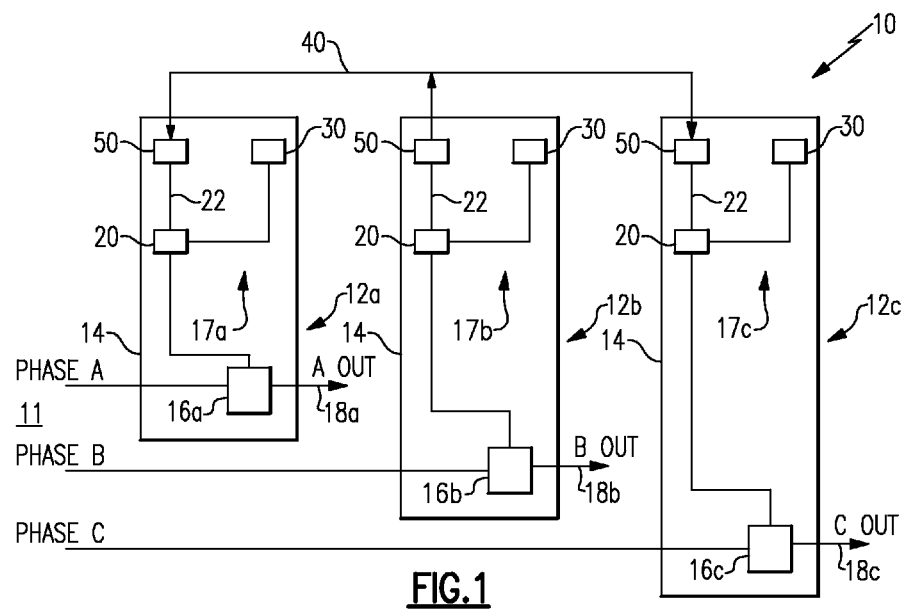
FIG. 1 illustrates a highly schematic multi-phase power control switch.

FIG. 1 illustrates a highly schematic multi-phase power control switch 10 having three solid-state power controller (SSPC) channels 12a-c. Each of the illustrated SSPC channels 12 includes a single SSPC 14, although it is understood that additional SSPC's 14 can be included within each SSPC channel 12a-c. Each of the SSPCs 14 includes a microcontroller 20, such as a microprocessor. Each of the SSPCs 14 also includes an independent floating DC power supply 30 providing power to the microcontroller 20, and an isolator 50 connecting a cross-communication line 22 of the microcontroller 20 to a data bus 40. As each of the microcontrollers 20 is connected to the data bus 40, cross-communication between each microcontroller 20 and each other microcontroller 20 over the data bus 40 is enabled. Each of the microcontrollers 20 provides control commands 17 to individual power phase switches 16.

To properly cross-communicate between the microcontrollers 20 and synchronize switching, one of the microcontrollers 20 is designated as the master microcontroller 20, and each of the remaining microcontrollers 20 is designated as a slave to the master microcontroller 20. In the illustrated example of FIG. 1, the microcontroller 20 of the center SSPC channel 12b is designated the master microcontroller, as indicated by the arrow directions on the connections to the data bus 40. The data bus 40, and the master-slave arrangement, allows the cross-communication and the coordination between each of the SSPC channels 12a-c and each of the SSPCs 14 within each SSPC channel 12a-c to be done locally between the SSPC channels 12a-c, without the need for a systems level controller to coordinate and synchronize the microcontrollers 20. Removing the systems level controller increases the response time of the cross-communication and increases the ability to implement timing critical controls within the multi-phase power control switch 10. This in turn supports synchronization of the controlled removal of power from each of the output power lines 18a, 18b and 18c.

In the absence of a data bus 40, each of the microcontrollers 20 must be directly connected to each of the other microcontrollers 20 to enable cross communication between the microcontrollers 20. Each of the direct connections would require an isolator circuit 50 to prevent the varied reference voltage levels between the microcontrollers 20 from affecting performance of the power control switch 10. These different reference levels may be determined by differences of voltage between external power inputs 11, In light of the present disclosure, it can be appreciated that practical implementations of the multi-phase power control switch 10 would incorporate additional microcontrollers 20 in each SSPC channel 12a-c or incorporate additional SSPC channels 12a-c, or both. Incorporation of additional microcontrollers 20 or SSPC channels 12a-c results in a geometric increase in the number of isolators 50 required for cross-communication with each additional microcontroller 20 when no data bus 40 is incorporated. By way of example, adding a single additional microcontroller to a system starting with three microcontrollers would require the addition of three isolators. Contrary to the busless arrangement, the illustrated cross-communication data bus 40 arrangement of the present disclosure only requires a linear increase of a single isolator for each new microcontroller 20 incorporated into the switch regardless of the number of microcontrollers currently in the switch.

Figure 2:
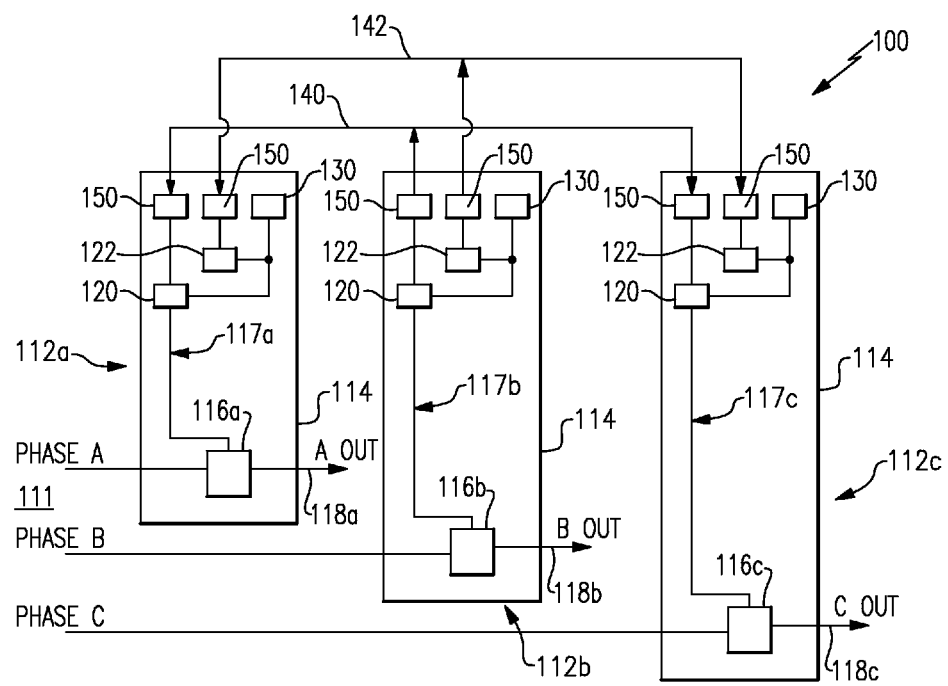
FIG. 2 illustrates a first alternate highly schematic, multi-phase power control switch.

FIG. 2 illustrates an alternate, highly schematic multi-phase power control switch 100 having three SSPC channels 112a-c, each of which has one SSPC 114. Each of the SSPCs 114 includes a primary microcontroller 120 and redundant microcontroller 122. Also included in each of the SSPC channels 112a-c of the example of FIG. 2 is an independent power supply 130 and two isolators 150, with each isolator 150 corresponding to one of the microcontrollers 120, 122. The additional redundant microcontrollers 122 provide backup in case a primary microcontroller 120 enters a failure state and can no longer provide switching control for the SSPC channel 12. Each of the redundant microcontrollers 122 cross-communicates with each of the other redundant microcontrollers 122 over a redundant data bus 142. As with the primary microcontrollers 120, the redundant microcontrollers 122 are connected to the redundant data bus 142 via an isolator 150. The redundant microcontrollers 122 are connected using the master/slave arrangement described above with regards to FIG. 1.

A further benefit of the local cross-communication between the microcontrollers 120, 122 over the data buses 140, 142 is that each redundant microcontroller 122 is only required to communicate with a corresponding primary microcontroller 120, and is not required to include cross-communication with primary microcontrollers 120 outside of the power channel 112a-c. Each redundant microcontroller 122 communicates with the corresponding primary microcontroller 120 and the corresponding primary microcontroller 120 can communicate any failure mode information through the primary data bus 140 to each other primary microcontroller 120. In this way, a switch to the redundant microcontrollers 122 in each channel of the multi-phase power control switch can be coordinated without requiring each redundant microcontroller 122 to directly communicate with each primary microcontroller 120 or requiring a systems level controller. As communication between the primary data bus 140 and the redundant data bus 142 occurs between microcontrollers 120, 122 in a single SSPC channel 112a-c, no additional isolators 150 are required.

Figure 3:
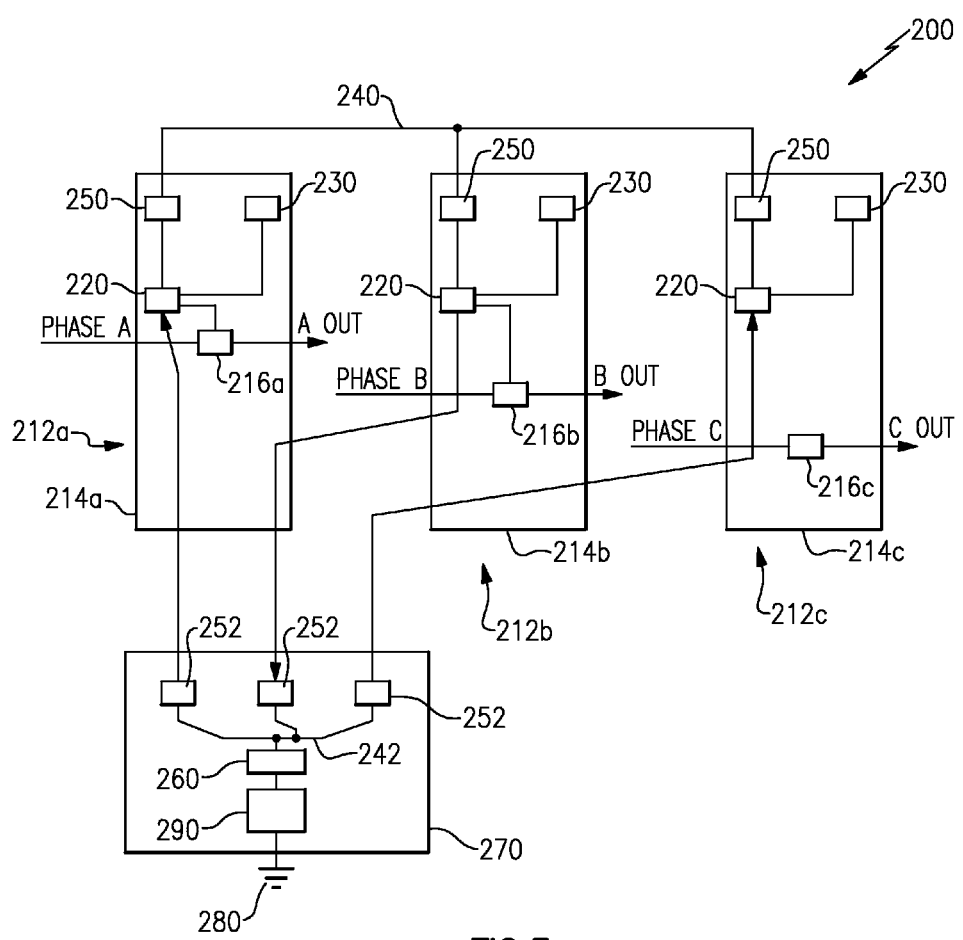
FIG. 3 illustrates a second alternate highly schematic multi-phase power control switch.

FIG. 3 illustrates a second alternative highly schematic multi-phase power control switch 200 including a trip synchronization signal capture module 270. Each of the SSPC channels 212a-c are arranged as in FIG. 1 with an isolator 250, a floating power supply 230, and a microcontroller 220. Furthermore, as described above with regards to FIG. 1, a data bus 240 enables cross-communication between the microcontrollers 220.

A synchronization bus 242, separate from the data bus 240, allows the microcontrollers 220 to receive ground referenced signals from a systems level controller, thereby enabling a systems level controller to monitor the power control switch 200. As with the cross-communication data bus 240, an isolator 252 is used between the microcontrollers 220 and the synchronization bus 242 to prevent the floating reference voltages of the floating power supplies 230 of each SSPC channel 212a-c from impacting communications between the SSPC channels 112a-c. Also connected to the synchronization bus 242 is an I/O (input/output) expander 260 and a pin input module 290. The I/O expander 260 and the pin input module 290 utilize input pins and jumpers connecting the input pins to program and synchronize the microcontrollers 220, as well as to interpret the signals from the synchronization bus 242 for the systems level controller. The pin input module 290 includes a connection to a system neutral reference voltage (a systems ground 280).

In each of the above-described examples, the data buses 40, 140, 142, 240, 242 can be an I2C data bus or any other known type of data bus. It is further understood that the above-described channel synchronization can be expanded to include more than three SSPC channels 12a-c, 112a-c, 212a-c and/or multiple SSPCs 14, 114, 214 in a single channel. It is further understood that a worker of ordinary skill in the art could combine the examples of FIG. 2 and FIG. 3 in light of this disclosure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A multi-phase power control switch comprising:
   a plurality of power controller channels, each of which includes at least one power controller having at least one microcontroller;
   an isolator corresponding to each of said microcontrollers and connecting a cross communication line of said corresponding microcontroller to a data bus;
   said data bus operable to enable cross communication between each of said microcontrollers and each other of said microcontrollers;
   a switch synchronization module having a synchronization bus connected to each of said microcontrollers via a second isolator corresponding to each microcontroller; and
   wherein said synchronization bus is connected to a systems level controller and wherein the systems level controller is configured to output ground referenced signals to said microcontrollers.

2. The multi-phase power control switch of claim 1, wherein at least one of said power controller channels comprises a plurality of power controllers, each of said power controllers comprising at least one microcontroller.

3. The multi-phase power control switch of claim 1, wherein each of said power controller channels comprises at least one solid state power controller.

4. The multi-phase power control switch of claim 3, wherein each of said solid state power controllers comprises at least a first primary microcontroller and a second redundant microcontroller.

5. The multi-phase power control switch of claim 4, wherein each of said first primary microcontrollers is connected to a first data bus via the corresponding isolator and wherein each of said second redundant microcontrollers is connected to a second redundant data bus via the corresponding isolator.

6. The multi-phase power control switch of claim 1, further comprising an input/output (I/O) module connecting said synchronization bus to a pin input module, and a system neutral connection connected to said pin input module.

7. The multi-phase power control switch of claim 6, wherein said pin input module is operable to program each of said microcontrollers connected to said switch synchronization bus, and wherein said pin input module is operable to be programmed via a plurality of jumper connections.

8. The multi-phase power control switch of claim 1, wherein said data bus is an I2C data bus.

9. The multi-phase power control switch of claim 1, wherein each of said power controller channels comprises a floating power supply connected to said at least one power controller, such that said floating power supply provides operational power to said at least one power controller.

10. A power distribution system comprising:
a plurality of multi-phase power control switches, wherein each of said multi-phase power control switches has a plurality of power controller channels, each of which includes at least one power controller having at least one microcontroller;
an isolator corresponding to each of said microcontrollers and connecting a cross communication line of said corresponding microcontroller to a data bus;
said data bus operable to enable cross communication between each of said microcontrollers and each other of said microcontrollers;
a switch synchronization module having a synchronization bus connected to each of said microcontrollers via a second isolator corresponding to each microcontroller; and
wherein said synchronization bus is connected to a systems level controller and wherein the systems level controller is configured to output ground referenced signals to said microcontrollers.

11. The power distribution system of claim 10, wherein at least one of said power controller channels comprises a plurality of power controllers, each of said power controllers comprising at least one microcontroller.

12. The power distribution system of claim 10, wherein each of said power controller channels comprises at least one solid state power controller.

13. The power distribution system of claim 12, wherein each of said solid state power controllers comprises at least a first primary microcontroller and a second redundant microcontroller.

14. The power distribution system of claim 13, wherein each of said first primary microcontrollers is connected to a first data bus via the corresponding isolator and wherein each of said second redundant microcontrollers is connected to a second redundant data bus via the corresponding isolator.

15. The power distribution system of claim 10, further comprising, an input/output (I/O) module connecting said synchronization bus to a pin input module, and a system neutral connection connected to said pin input module.

16. The power distribution system of claim 15, wherein said pin input module is operable to program each of said microcontrollers connected to said switch synchronization bus, and wherein said pin input module is operable to be programmed via a plurality of jumper connections.

17. The power distribution system of claim 10, wherein said data bus is an I2C data bus.

18. The multi-phase power control switch of claim 15, wherein said pin input module includes a connection to a system neutral reference voltage.

* * * * *